(12) United States Patent  (10) Patent No.: US 8,711,110 B2
Barras et al.  (45) Date of Patent: Apr. 29, 2014

(54) TOUCHSCREEN WITH Z-VELOCITY ENHANCEMENT

(75) Inventors: Lawrence Scott Barras, San Jose, CA (US); Kenneth James Albanowski, Fremont, CA (US); Thomas David Hughes, Champaign, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 12/877,776

(22) Filed: Sep. 8, 2010

(65) Prior Publication Data

US 2011/0059778 A1 Mar. 10, 2011

Related U.S. Application Data

(60) Provisional application No. 61/240,606, filed on Sep. 8, 2009.

(51) Int. Cl.
*G06F 3/041* (2006.01)

(52) U.S. Cl.
USPC .................. 345/173; 345/176; 178/18.01

(58) Field of Classification Search
USPC ............... 345/173–176; 178/18.01–18.09
See application file for complete search history.

(56) References Cited

U.S. PATENT DOCUMENTS

| | | | | |
|---|---|---|---|---|
| 4,988,982 A * | 1/1991 | Rayner et al. | | 345/173 |
| 2003/0076306 A1 * | 4/2003 | Zadesky et al. | | 345/173 |
| 2003/0122787 A1 * | 7/2003 | Zimmerman et al. | | 345/173 |
| 2006/0125802 A1 * | 6/2006 | Liang et al. | | 345/173 |
| 2006/0274046 A1 * | 12/2006 | Hillis et al. | | 345/173 |
| 2007/0125633 A1 * | 6/2007 | Boillot | | 200/52 R |
| 2008/0062126 A1 | 3/2008 | Algreatly | | |
| 2008/0174570 A1 * | 7/2008 | Jobs et al. | | 345/173 |
| 2008/0266271 A1 | 10/2008 | Van Berkel et al. | | |
| 2008/0288895 A1 | 11/2008 | Hollemans et al. | | |
| 2009/0295743 A1 * | 12/2009 | Nakajoh | | 345/173 |
| 2010/0020021 A1 * | 1/2010 | Mills et al. | | 345/173 |
| 2010/0090712 A1 * | 4/2010 | Vandermeijden | | 324/658 |

FOREIGN PATENT DOCUMENTS

KR 20090023919 3/2009

* cited by examiner

*Primary Examiner* — Premal Patel (57) ABSTRACT

A system and a method are disclosed for detecting an interaction, such as physical contact, with a touch-sensitive screen. The screen comprises a plurality of cells each associated with a signal value, such as a capacitance, that is modified based on the proximity of an object to the screen. During a first time interval, a first signal value associated with a cell is captured and during a second time interval a second signal value associated with the cell is captured. A difference is computed by subtracting the second signal value from the first signal value. The difference is used to classify the proximity of the object to the screen. For example, the object is classified as approaching the screen if the difference is positive and non-zero or the object is classified as moving away from the screen if the difference is negative and non-zero.

18 Claims, 5 Drawing Sheets

TOUCHSCREEN WITH Z-VELOCITY ENHANCEMENT

CROSS REFERENCE TO RELATED APPLICATIONS

This application claims the benefit of U.S. Provisional Application No. 61/240,606, filed Sep. 8, 2009, which is incorporated by reference in its entirety.

BACKGROUND

1. Field of Art

The disclosure generally relates to the field of mobile computing devices and more particularly to identifying interaction with a touchscreen of a mobile computing device.

2. Description of Art

A growing number of devices, such as smart phones or tablet computers, use touch-sensitive screens, or "touchscreens," as their primary input mechanism. Touchscreens may be constructed in a variety of ways, such as, pressure-sensitive (resistive), electrically sensitive (capacitive), acoustically sensitive (SAW or surface acoustic wave), photo-sensitive (infra-red), to receive information from a user. Most conventional touchscreen designs identify when an object, such as a user or a stylus, physically contacts a region of the touchscreen by comparing the signal intensity of different regions of the touchscreen to a threshold value. When the signal intensity of a region exceeds the threshold, the touchscreen determines that an object is physically touching that region.

However, relying solely on comparison of signal intensity to a threshold introduces inaccuracy into contact detection. For example, as an object moves towards the touchscreen or moves away from the touchscreen, the centroid of the object shifts, causing instability in the detection of physical contact with the touchscreen. Also, as the surface area of an object contacting the touchscreen changes, regions of the touchscreen where signal intensity changes, causing errors in identification of the region of the touchscreen being contacted. Additionally, in some touchscreen designs, external conditions, such as the presence of a screen covering or the surface on which the touchscreen rests, affects a baseline value of the touchscreen, introducing errors into the determination of when the signal intensity exceeds the threshold.

Additionally, conventional touchscreens are only able to determine when the touchscreen is physically contacted and do not provide any information about the intensity at which the touchscreen is contacted.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium detects an interaction, such as physical contact, with a touch-sensitive screen. The screen comprises a plurality of cells each associated with a signal value, such as a capacitance, that is modified based on the proximity of an object to the screen. For example, as an object approaches the cell, the cell's associated signal value increases or as an object moves away from the cell, the cell's associated signal value decreases. During a first time interval, a first signal value associated with a cell is captured and a second signal value associated with the cell is captured during a second time interval. A difference is computed by subtracting the second signal value from the first signal value. For example, a prior signal value is subtracted from a current signal value. The difference is used to classify the interaction of the object to the screen or the proximity of the object to the screen. For example, the object is classified as approaching the screen if the difference is a positive value or the object is classified as moving away from the screen if the difference is a negative value.

Example Mobile Computing Device

Figure 1A:
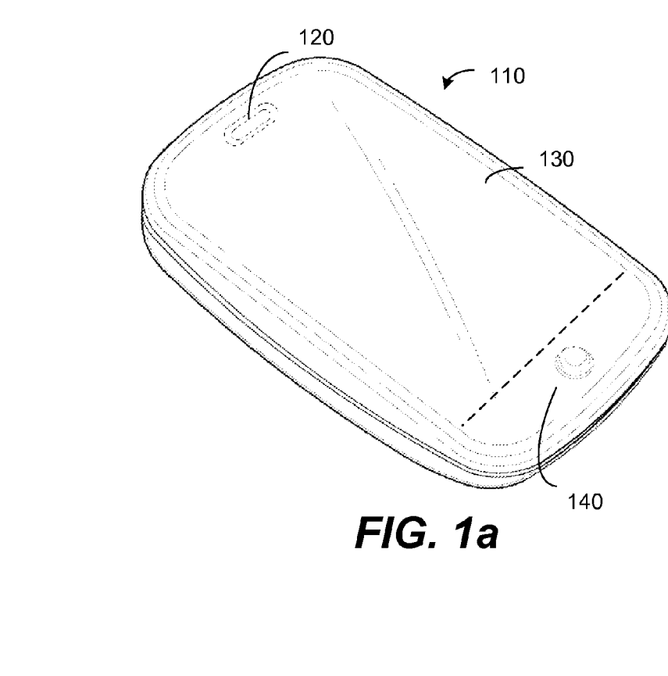
FIG. 1a illustrates one example embodiment of a mobile computing device in a first positional state.
Figure 1B:
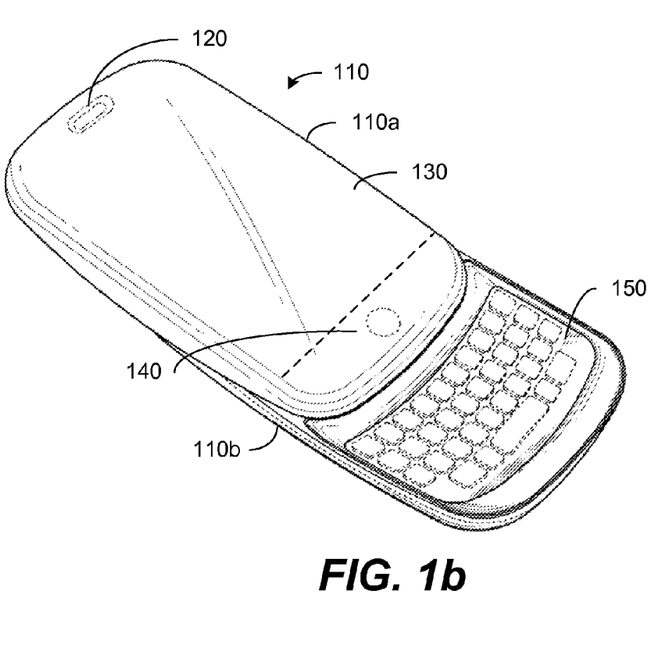
FIG. 1b illustrates one example embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook computer, tablet computer or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., tablet computers, desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smartphone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., electrically sensitive (capacitive) or other configuration where the position of an object relative to the screen affects a value) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
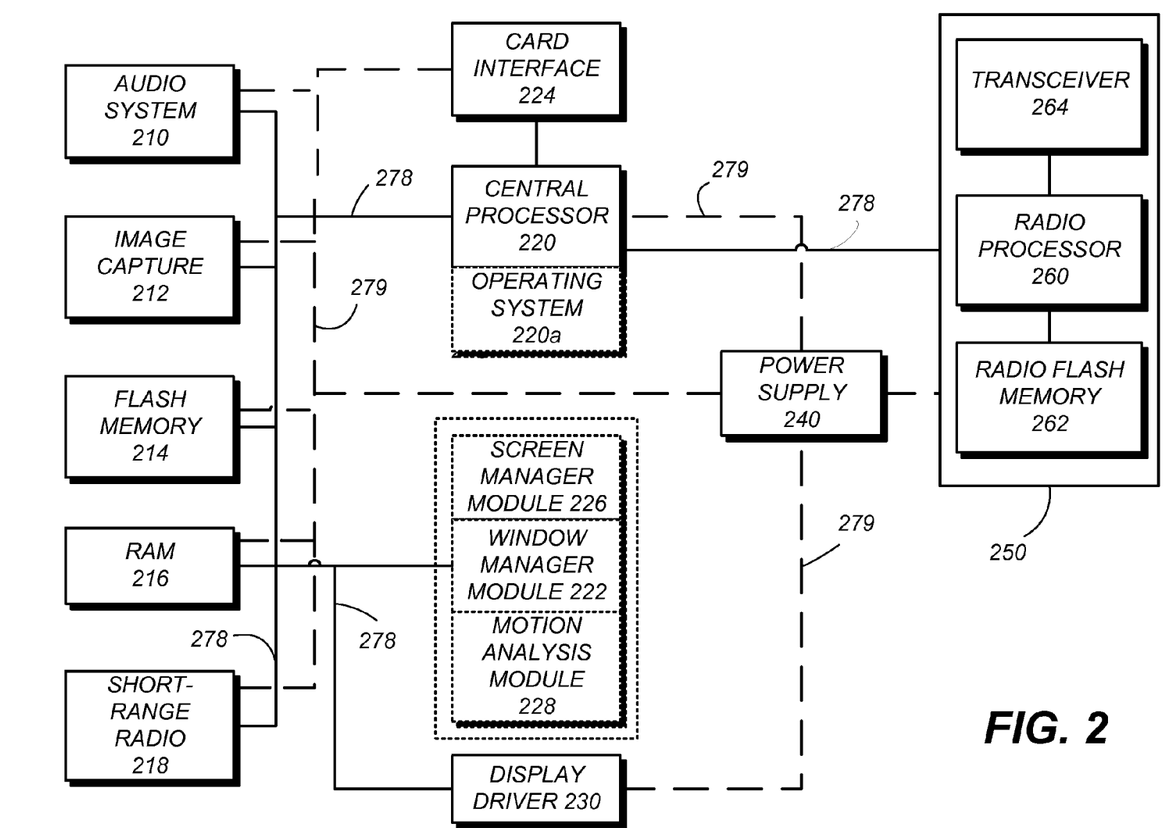
FIG. 2 illustrates one example embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes one or more processors (for ease of discussion referenced herein as a central processor 220), a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, WINDOWS PHONE and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor 220 communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A motion analysis module 228 comprises software that is, for example, integrated with the operating system 220a and/or the screen manager module 226 or configured to be an application operational with the operating system 220a and/or the screen manager module 226. Alternatively, the motion analysis module 228 may comprise firmware, for example, stored in the flash memory 214 or instructions stored in the RAM 216. The motion analysis module 228 captures a sequence of signal values associated with the screen 130 over time. In one embodiment, the screen 130 comprises a plurality of cells, each having an associated signal value which is modified based on the proximity of an object to the cell. For example, when an object is touching a cell, the signal value increases from a baseline value to a maximum value, and the signal value decreases from the maximum value to the baseline value when the object is no longer touching the cell. In an embodiment, when an object approaches a cell, the signal value increases when the object moves towards the cell; conversely, the signal value decreases when the object moves away from the cell. In an alternative embodiment, when an object approaches a cell, the signal value decreases when the object moves towards the cell; conversely, the signal value increases when the object moves away from the cell.

The motion analysis module 228 captures the signal value associated with one or more cells of the screen 130 at different time intervals. For example, at time "t" the motion analysis module 228 captures signal values associated with one or more cells of the screen 130 and again captures signal values associated with one or more cells of the screen 130 at time "t+1." Capturing signal values over time allows the motion analysis module 228 to determine the proximity of an object to a cell based on changes in the signal value of the cell over time and to classify interactions between the object and the cell. For example, the magnitude and direction of the change in a signal value determines how rapidly an object approaches the screen 130 or recedes from the screen 130. The operation of the motion analysis module 228 is further described below with reference to FIGS. 3-5.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), Long-Term Evolution (LTE) and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Relationship Between Signal Value and Object Proximity to Screen

Figure 3:
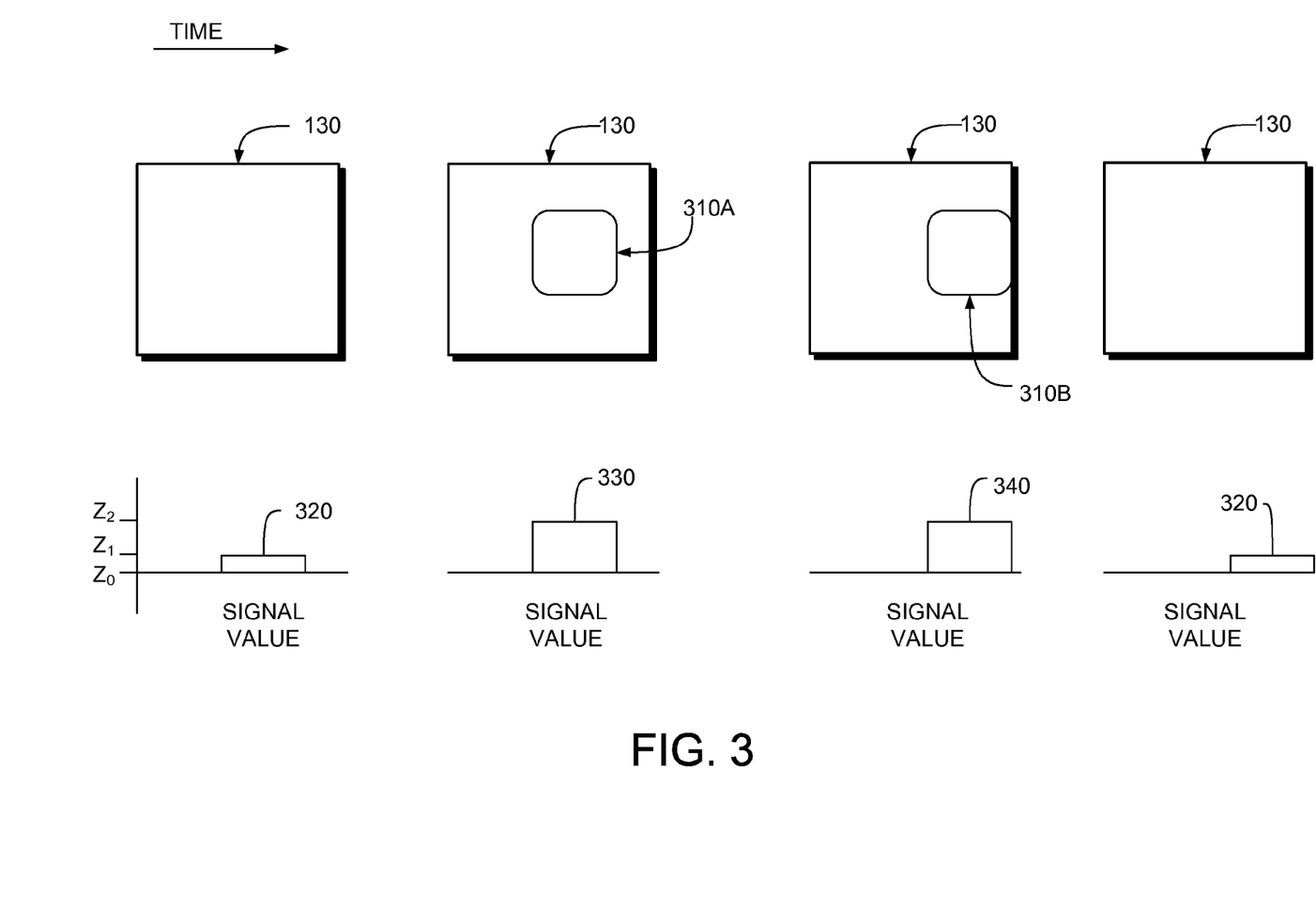
FIG. 3 illustrates an example correlation between a signal value associated with one or more cells of a screen and the proximity of an object to the screen.

FIG. 3 shows the correlation between the proximity of an object to the screen 130 and a signal value associated with one or more cells of the screen 130. In an embodiment, the screen 130 comprises a touch-sensitive display, such as an electrically sensitive display, in which a signal value, such as capacitance, is modified based on the proximity of an object to the screen 130. The screen 130 is partitioned into multiple cells each associated with a signal value. In one embodiment, the signal value comprises a capacitance. In other embodiments, the signal value comprises a different quantity that depends on the proximity of an object to the screen 130.

In one embodiment, the screen 130 includes a two-dimensional array of electrodes which form a grid of capacitors when voltage is applied to the array of electrodes. In this embodiment, a cell comprises an element of the two-dimensional array of electrodes. In another embodiment, the screen 130 is divided into a two-dimensional array, and each element of the array comprises a cell. Hence, the cells allow identification of an object relative to the screen 130 in two dimensions, and the disclosed embodiments allow determination of an object's position relative to the screen 130 in a third dimension based on changes in the signal value associated with a cell.

As the proximity of an object, such as a stylus or a finger, to a cell changes, the signal value associated with the cell changes. For example, as an object becomes nearer to a cell, the signal value associated with the cell increases, or as an object becomes farther from a cell, the signal value associated with the cell decreases. As another example, as an object becomes nearer to a cell, the signal value associated with the cell decreases, or as an object becomes farther from a cell, the signal value associated with the cell increases. Similarly, as the position of an object within the screen changes, the signal value associated with different cells also changes. FIG. 3 shows an example of signal value modification as an object moves within the screen 130. In FIG. 3, a representation of the screen 130 is shown, and a depiction of the signal value associated with the screen 130 is shown below the representation of the screen 130 so that the signal value is aligned with the horizontal-axis of the screen 130 to simplify presentation. Additionally, in FIG. 3, the magnitude of the signal value is variously denoted by $Z_0$, $Z_1$ and $Z_2$. In one embodiment, the signal value is dependent on a capacitance associated with the cell.

In the example of FIG. 3, as an object is approaching a region of the screen 130 comprising one or more cells, the signal value of the cells comprising the region changes from a baseline value, denoted in FIG. 3 as $Z_0$, to a first value 320, which is denoted in FIG. 3 as $Z_1$. For clarity, FIG. 3 shows changes in signal value relative to a baseline value, which may be a non-zero value. Hence, when an object is proximate to a region of the screen 130, but before the object is physically contacting the screen 130, the signal value of that region changes from the baseline value of $Z_0$, to the first value 320 of $Z_1$.

When the object physically contacts, or touches, a first region 310A of the screen 130, the signal value associated with the first region 310A of the screen 130 further increases from the first value 320 to a second value 330, denoted in FIG. 3 as $Z_O$. After touching the first region 310A of the screen, the object may move throughout the screen, causing the signal values of different cells to change as the object physically contacts different regions of the screen. For example, as the object moves from touching the first region 310A of the screen 130 to touching a second region 310B of the screen 130, the signal values associated with the different regions change. Responsive to the object touching the second region 310B of the screen 130, the signal value is modified to a second value 340 where the signal value of cells associated with the second region 310B of the screen 130 increases, while the signal value of cells associated with the first region 310A decreases. Hence, as an object changes position within the screen 130, the signal value of cells within the screen 130 is modified based on the region of the screen 130 that the object physically contacts.

When the object moves away from the screen 130, the signal value of the region of the screen 130 that the object was last touching (e.g., the second region 310B in the example shown in FIG. 3) is reduced, but does not immediately return to the baseline value. Rather, while the object moves away from the screen, the signal value of the region of the screen 130 to which the object is proximate is modified to the first value 320. While the object is proximate to the screen 130, the object interacts with the screen, preventing the signal value from returning to the baseline value.

Because the signal value is modified by the proximity of an object to the screen, even when the object is not physically touching the screen, variations the signal value indicate an object's proximity to the screen 130. Changes in the signal value indicate whether the object is moving towards the screen or is moving away from the screen.

While FIG. 3 depicts an example where the signal value increases as an object becomes nearer to the screen 130, in an alternative embodiment, the signal value decreases as an object becomes nearer to the screen 130. In addition, it is noted that although the example provided is in the context of contact with the screen 130, a process can be configured to being just prior to physical contact with the screen 130. For example, capture of signal values associated with contact of the screen 130 may occur just before actual physical contact with the screen 130 is made. In such configurations, the screen 130 may be configured to detect a change in an electrical field just above the physical surface of the screen 130, thereby triggering the start of activity for capturing signal values.

Figure 4:
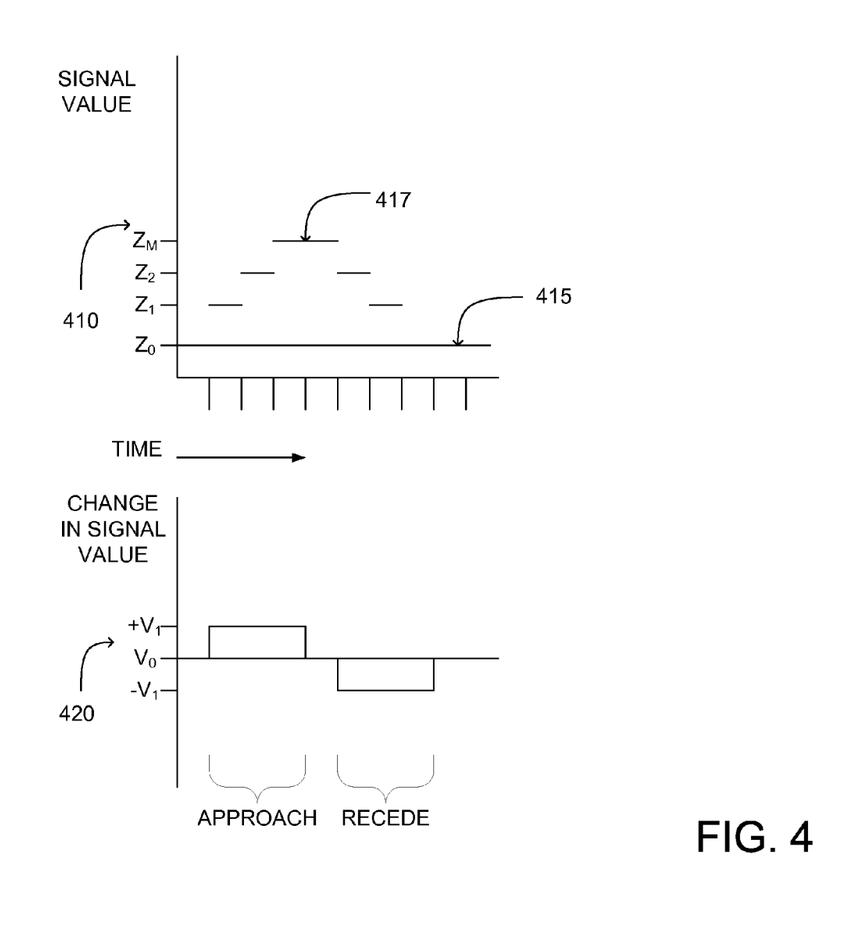
FIG. 4 illustrates an example relationship between a signal value and object velocity.

FIG. 4 shows an example of the signal value data captured by the motion analysis module 228 and generated by the motion analysis module 228. For purposes of illustration, FIG. 4 depicts signal values for a single cell of the screen 130, although in other embodiments the motion analysis module 228 captures signal values from multiple cells. In FIG. 4, the signal values 410 for a cell are shown graphically during different time intervals. FIG. 4 shows the magnitude of the signal values 410 as $Z_0$, $Z_1$, $Z_2$ and $Z_M$, and in one embodiment the signal values 410 are dependent on a capacitance associated with the cell. Similarly, signal value changes 420 are also shown graphically for different time intervals, with the magnitude of the signal value changes 420 denoted as $+V_1$, $V_0$ and $-V_1$. Signal values 410 at different time intervals are used to generate the signal value changes 420 shown in FIG. 4. Also, FIG. 4 shows an embodiment where the signal value increases as an object becomes nearer to the screen 130 and decreases when the object moves away from the screen 130. In an alternative embodiment, the signal value decreases when the object approaches the screen 130 and increases when the object moves away from the screen 130.

FIG. 4 shows an embodiment where the signal value of the cell has a non-zero baseline value 415, depicted in FIG. 4 as $Z_0$, although in other embodiments, the baseline value 415 may be zero. The proximity of an object to the cell increases causes the signal value 410 from the baseline value 415. As the object becomes closer to the cell, the signal value increases to a maximum value 417, shown in FIG. 4 as $Z_M$, indicating that the object is physically contacting the cell. However, as the object approaches the cell but before the object physically contacts the cell, the signal value 417 increases to intermediate values which are proportionate to the object's distance from the cell. FIG. 4 illustrates these intermediate values as $Z_1$ and $Z_2$. Similarly, as the object moves away from the cell, the signal value 417 decreases from the maximum value 417, or $Z_M$, to smaller intermediate values proportionate to the distance between the object and the screen 130 (e.g., $Z_1$ and $Z_2$) until the baseline value 415 (e.g., $Z_0$) is reached.

Because the signal values 410 change based on the proximity of an object to the cell, the motion analysis module 228 calculates the difference between a current signal value 410 and a prior signal value 410. The calculated signal value change 420 measures the increase or decrease in signal values 410 over time, producing a first derivative of the signal value 410 which describes the velocity of object movement relative to the screen 130. The magnitude of the signal value change 420 allows the motion analysis module 228 to determine how quickly an object moves towards the cell or how quickly an object moves away from the cell. For example, a large signal value change 420 indicates that the object is rapidly moving towards, or moving away from, the cell. The direction, or sign, of the signal value change 420 allows the motion analysis module 228 to determine whether the object is moving towards the cell or is moving away from the cell. A signal value change 420 greater than zero corresponds to the signal value magnitude increasing over time, indicating that the object is approaching the cell. Conversely, a signal value change 420 less than zero corresponds to the signal value magnitude decreasing over time, indicating that the object is moving away from the cell. Additionally, a signal value change 420 of zero indicates that the object is not moving towards the cell and is also not moving away from the cell.

Referring again to FIG. 4, the depicted signal value change 420 shows an object initially approaching the cell at a constant rate of speed and then physically contacting the cell for a time interval. The initial movement of the object towards the cell is shown by the positive, non-zero signal value change 420, graphically shown in FIG. 4 as the value $+V_1$, which corresponds to the signal value increasing from the baseline value 415 to the maximum value 417 while taking on intermediate values increasing as the object becomes closer to the cell. When the signal value change 420 drops to zero, the signal value 410 has reached the maximum value 417 and remains at the maximum value 417, indicating that the object is physically contacting the cell. As there is no change in the signal value 410, the signal value change 420 is at a baseline level, shown in FIG. 4 as $V_0$. In an embodiment the baseline level is a zero value. In the example shown by FIG. 4, after physically contacting the cell, the object moves away at a constant rate of speed, indicated by the negative, non-zero signal value change 420, shown in FIG. 4 as the value $-V_1$, which corresponds to the decrease in signal value 410 from the maximum value 417 to intermediate values which decrease as the object becomes farther from the cell and to the baseline value 415.

Measuring the rate at which an object's proximity to a cell of the screen 130 changes allows the motion analysis module 228 to more accurately detect when an object physically contacts a cell, or a region, of the screen 130. In an embodiment, the motion analysis module 228 determines that an object physically contacts the screen 130 when the signal value 410 exceeds a threshold value and the signal value change 420 is zero. Using the signal value change 420 to identify physical contact with the screen 130 allows accurate detection of physical contact even when there is variability in the baseline value 415 based on external conditions that introduce error into a comparison between the signal value and a threshold. Additionally, specifying the rate at which an object's proximity to the screen 130 changes enables the signal value change 420 to provide additional input for use by an application or by the operating system 220a to manipulate data. For example, the signal value change 420 may be used to alter the rate at which data is navigated or to alter the tone of an audio signal.

Method for Proximity Detection

Figure 5:
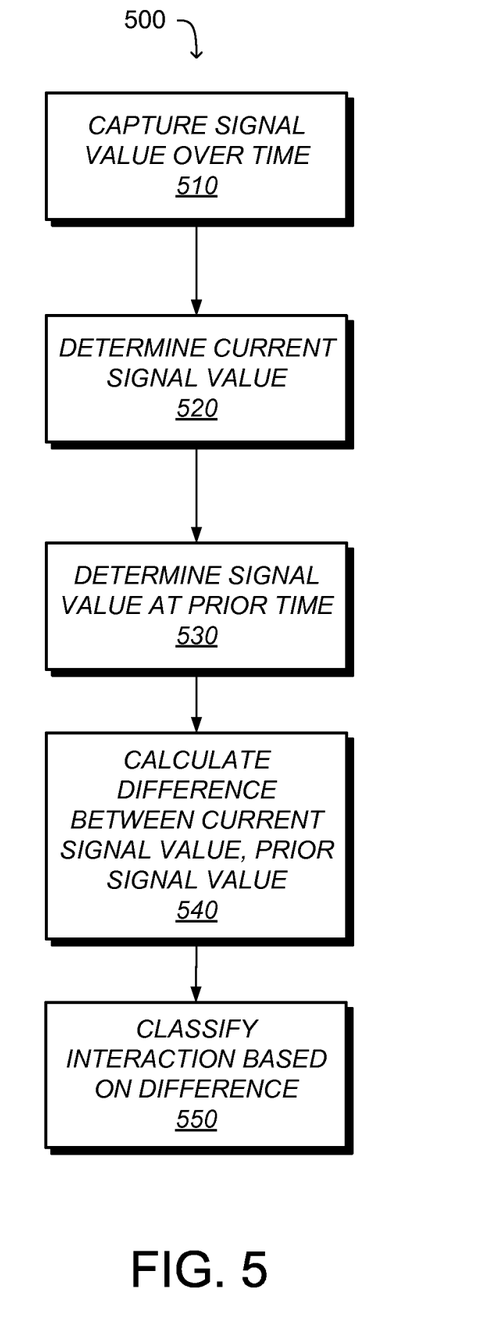
FIG. 5 illustrates one embodiment of an example method for detecting interaction with a screen using velocity data.

FIG. 5 shows an embodiment of a method 500 for detecting interaction, such as physical contact, with a screen 130 using velocity calculation. In an embodiment, the steps depicted in the method 500 of FIG. 5 are implemented by instructions for performing the described actions embodied or stored within a computer readable medium, e.g., flash memory 214 or RAM 216, that are executable by a processor, such as central processor 220. Those of skill in the art will recognize that the method 500 may be implemented in embodiments of hardware and/or software or combinations thereof. Moreover, other embodiments can include different and/or additional steps than the ones shown in FIG. 5. For purposes of illustration, FIG. 5 describes the method 500 for detecting physical contact with the screen 130 in the context of a single cell within the screen 130; however, the method 500 is also applicable to multiple cells within a screen 130.

The motion analysis module 228 captures 510 a signal value associated with a cell during a plurality of time intervals. For example, during a first time period, the motion analysis module 228 captures 510 a first signal value associated with the cell and captures 510 a second signal value associated with the cell during a second time period.

To identify physical contact with the screen 130, the motion analysis module 228 initially determines 520 a current signal value from the captured signal values. The motion analysis module 228 then accesses previously captured signal value stored in the motion analysis module 228 or the RAM 216 to determine 530 a signal value associated with a prior time interval. For example, the signal value associated with the current time interval is determined 520 from the data most recently captured 510 by the motion analysis module 228 and the signal value associated with the preceding time interval is also determined 530 by accessing stored signal values. The difference between the current signal value and the prior signal value is then calculated 540. In one embodiment, the prior signal value is subtracted from current signal value to calculate 540 the difference.

The calculated difference between signal values is then used by the motion analysis module 228 to classify 550 an interaction with the cell. In one embodiment, the current signal value is used in addition to the difference between signal values to classify 550 the interaction. For example, an interaction is classified 550 as physical contact with the cell when the current signal value exceeds a threshold and the difference is zero. As additional examples, an interaction is classified 550 as movement away from the cell when the difference is negative or an interaction is classified 550 as movement towards the cell when the difference is positive. In an embodiment, the magnitude of the difference is further used to classify 550 the rate at which an object moves towards the cell or moves away from the cell. Hence, the method 500 allows classification 550 of the type of interaction as well as the intensity of the interaction.

Thus, the disclosed embodiments beneficially allow tracking of the velocity at which an object moves towards or moves away from a screen 130 by measuring the increase or decrease in a signal value associated with one or more cells included in the screen. This allows more precise determination of the time when an object physically contacts the screen 130. Additionally, by calculating the velocity at which the object approaches or moves away from the screen 130, the disclosed embodiments provide additional information that may be used to more precisely classify how the object interacts with the screen 130 or information that may be used by an application or by the operating system 220*a* to manipulate data. Further, tracking the velocity at which an object moves relative to the screen 130 allows more accurate tracking of the movement of a large object, such as a thumb or palm, across the screen 130. For example, identifying an increasing number of positive velocities in adjacent cells identifies a large object physically touching the screen 130 and more accurately determine the centroid of the large object to more accurately track its motion. Additionally, calculating the velocity at which an object moves towards or away from the screen 130 enables calculation of the object's acceleration relative to the screen 130 by calculating the difference between the current velocity and a prior velocity, providing additional information for interaction classification.

Additional Considerations

Some portions of above description describe the embodiments in terms of algorithms and symbolic representations of operations on information, for example, as illustrated and described with respect to FIG. 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting an interaction, such as physical contact, with a screen by calculating the velocity at which an object approaches or moves away from the screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for classifying a movement of an object relative to a region of a touch-sensitive screen of a computing device, the region comprising a plurality of cells, the method performed by one or more processors and comprising:

detecting a movement of the object relative to the region the touch-sensitive screen by, for one or more of the plurality of cells, (i) determining a first signal value corresponding to a first position of the object relative to the cell at a first time, and (ii) determining a second signal value corresponding to a second position of the object relative to the cell at a second time;

calculating a velocity of the movement of the object based on the first signal value at the first time and the second signal value at the second time, the velocity having a magnitude and a direction; and     classifying the movement of the object as either approaching or moving away from the region of the touch-sensitive screen based on at least the magnitude and direction associated with the velocity.

2. The method of claim 1, further comprising:

responsive to the magnitude equaling zero and the first signal value exceeding a threshold, determining that the object is physically contacting the touch-sensitive screen.

3. The method of claim 1, further comprising:
responsive to the magnitude associated with the velocity of the movement of the object exceeding a threshold, performing a first action; and
responsive to the magnitude associated with the velocity of the movement of the object not exceeding the threshold, performing a second action.

4. The method of claim 1, wherein the second signal value is previously stored in a memory, and wherein determining the second signal value further comprises retrieving the previously stored second signal value from the memory.

5. The method of claim 1, wherein the first signal value comprises a value that depends on a distance of the object from the touch-sensitive screen.

6. The method of claim 1, wherein the magnitude includes a first magnitude, the direction includes a first direction, the velocity of the movement of the object includes a first velocity of the movement, and classifying the movement of the object as either approaching or moving away from the touch-sensitive screen based on at least the magnitude and the direction associated with the velocity of the movement comprises:
detecting a third signal value corresponding to a third position of the object relative to the region of the touch-sensitive screen at a third time;
determining a fourth signal value corresponding to a fourth position of the object relative to the region of the touch-sensitive screen at a fourth time;
calculating a second velocity of the movement by subtracting the fourth signal value from the third signal value, the second velocity associated with a second magnitude and a second direction;
calculating an acceleration of the movement by subtracting the second velocity of the movement from the first velocity of the movement; and
classifying the movement using the acceleration, the second magnitude and the second direction.

7. The method of claim 1, wherein each of the cells comprises an element of a two-dimensional array of electrodes.

8. A non-transitory computer readable storage medium storing instructions, the instructions when executed by at least one processor cause the at least one processor to:
detect a movement of an object relative to a region of a touch-sensitive screen, the region comprising a plurality of cells, by, for one or more of the plurality of cells (i) determining a first signal value corresponding to a first position of an object relative to the cell at a first time and (ii) determine a second signal value corresponding to a second position of the object relative to the cell at a second time;
calculate a velocity of the movement based on the first signal value at the first time and the second signal value at the second time, the velocity having a magnitude and a direction;
classify the movement using the magnitude and the direction associated with the velocity, wherein classifying the movement using the magnitude and the direction associated with the velocity comprises:
determine that the direction is a positive direction or a negative direction;
in response to determining that the direction is the positive direction, classify the movement of the object approaching the region of the touch-sensitive screen; and
in response to determining that the direction is the negative value, classify the movement of the object moving away from the region of the touch-sensitive screen.

9. The non-transitory computer readable storage medium of claim 8, further storing instructions that cause the at least one processor to:
in response to the magnitude equaling zero and the first signal value exceeding a threshold, determine that the object is physically contacting the touch-sensitive screen.

10. The non-transitory computer readable storage medium of claim 8, further storing instructions that cause the at least one processor to:
perform a first action in response to the magnitude associated with the velocity of the movement exceeding a threshold; and
perform a second action in response to the magnitude associated with the velocity of the movement not exceeding the threshold.

11. The non-transitory computer readable storage medium of claim 8, wherein the first signal value comprises a value which depends on a distance of the object from the touch-sensitive screen.

12. The non-transitory computer readable storage medium of claim 8, wherein the second signal value is previously stored in a memory, and wherein the instructions further cause the at least one processor to determine the second signal value by retrieving the previously stored second signal value from the memory.

13. The non-transitory computer readable storage medium of claim 8, wherein the magnitude includes a first magnitude, the direction includes a first direction, the velocity of the movement includes a first velocity, and wherein the instructions further cause the at least one processor to classify the movement by:
detecting a third signal value corresponding to a third position of the object relative to the region of the touch-sensitive screen at a third time interval;
determining a fourth signal value corresponding to a fourth position of the object relative to the region of the touch-sensitive screen at a fourth time interval;
calculating a second velocity of the movement by subtracting the fourth signal value from the third signal value, the second velocity associated with a second magnitude and a second direction;
calculating an acceleration of the movement by subtracting the second velocity of the movement from the first velocity of the movement; and
classifying the movement using the acceleration, the second magnitude and the second direction.

14. A mobile computing device comprising:
a touch-sensitive screen configured to display information and to detect a movement of an object relative to the touch-sensitive screen, the touch-sensitive screen comprising a region comprising a plurality of cells;
a processor coupled to the touch-sensitive screen;
a memory including instructions to be executed by the processor, the instructions when executed by the processor cause the processor to perform a computer-implemented method comprising:
detecting a movement of the object relative to the region of the touch-sensitive screen by, for one or more of the plurality of cells, (i) determining a first signal value corresponding to a first position of the object relative to the cell at a first time, and (ii) determining a second signal value corresponding to a second position of the object relative to the region of the touch-sensitive screen at a second time;
calculating a velocity of the movement based on the first signal value at the first time and the second signal value at the second time, the velocity having with a magnitude and a direction, classifying the movement using the magnitude and the direction associated with the velocity, wherein classifying the movement using the magnitude and the direction associated with the velocity comprises:

determining that the direction is a positive direction or a negative direction;

in response to determining that the direction is the positive direction, classifying the movement of the object approaching the region of the touch-sensitive screen; and in response to determining that the direction is the negative value, classifying the movement of the object moving away from the region of the touch-sensitive screen.

15. The mobile computing device of claim 14, wherein the memory further includes instructions that cause the processor to, responsive to the magnitude equaling zero and the first signal value exceeding a threshold, determine that the object is physically contacting the touch-sensitive screen.

16. The mobile computing device of claim 14, wherein the memory further includes instructions that cause the processor to perform steps comprising:

responsive to the magnitude associated with the velocity of the movement exceeding a threshold, performing a first action; and responsive to the magnitude associated with the velocity of the movement not exceeding the threshold, performing a second action.

17. The mobile computing device of claim 14, wherein the first signal value comprises a value which depends on a distance from the object to the touch-sensitive screen.

18. The mobile computing device of claim 14, wherein the magnitude includes a first magnitude, the direction includes a first direction, the velocity of the movement includes a first velocity, and wherein the memory further includes instructions that cause the processor to classify the movement using the magnitude and the direction associated with the velocity of the movement by:

detecting a third signal value corresponding to a third position of the object relative to the region of the touch-sensitive screen at a third time interval;

determining a fourth signal value corresponding to a fourth position of the object relative to the region of the touch-sensitive screen at a fourth time;

calculating a second velocity of the movement by subtracting the fourth signal value from the third signal value, the second velocity associated with a second magnitude and a second direction;

calculating an acceleration of the movement by subtracting the second velocity of the movement from the first velocity of the movement; and classifying the movement using the acceleration, the second magnitude and the second direction.

* * * * *